United States Patent

Levine et al.

[15] 3,685,376
[45] Aug. 22, 1972

[54] APPARATUS FOR MAKING A LAMINATED FIBROUS STRIP

[72] Inventors: Samson P. Levine; Ralph W. Kugler; Anthony J. Candek, all of Pittsburgh, Pa.

[73] Assignee: Westinghouse Electric Corporation, Pittsburgh, Pa.

[22] Filed: Dec. 22, 1970

[21] Appl. No.: 100,683

[52] U.S. Cl. ..........................83/87, 83/88, 83/355, 83/519, 83/556, 156/62.4, 156/512
[51] Int. Cl. ............................................B65h 35/08
[58] Field of Search ......83/87, 88, 556, 355; 270/31; 156/512, 62.4

[56] References Cited

UNITED STATES PATENTS

| | | | |
|---|---|---|---|
| 3,122,042 | 2/1964 | Littell et al. | .............83/556 X |
| 3,436,996 | 4/1969 | Toeusing | ......................83/87 |
| 3,491,636 | 1/1970 | Braun | .....................83/355 X |
| 3,506,254 | 4/1970 | Stumpf | .......................270/31 |

*Primary Examiner*—Frank T. Yost
*Attorney*—F. Shapoe and Lee P. Johns

[57] ABSTRACT

A system for preparing an elongated laminated strip having a plurality of layers of metal fibers with the fibers of each layer being disposed at angles to the fibers of adjacent layers, including at least two fiber cutting shredders which are mounted on a movable carriage above a conveyor belt. The movable carriage travels back and forth over a short segment of travel of the conveyor belt and the shredders are rotatably mounted on the carriage for dropping successive layers of metal fibers onto the conveyor belt with the fibers of each layer being disposed at angles to each other. At the end of travel of the carriage in each direction the shredders are rotated to different angles and the belt simultaneously moves a short increment of travel, whereby a continuous multiple layered strip of metal fibers is produced. At another work station on the belt an adhesive binder is applied to the strip so that upon leaving the belt the strip may be wound upon a reel for storage and handling.

4 Claims, 7 Drawing Figures

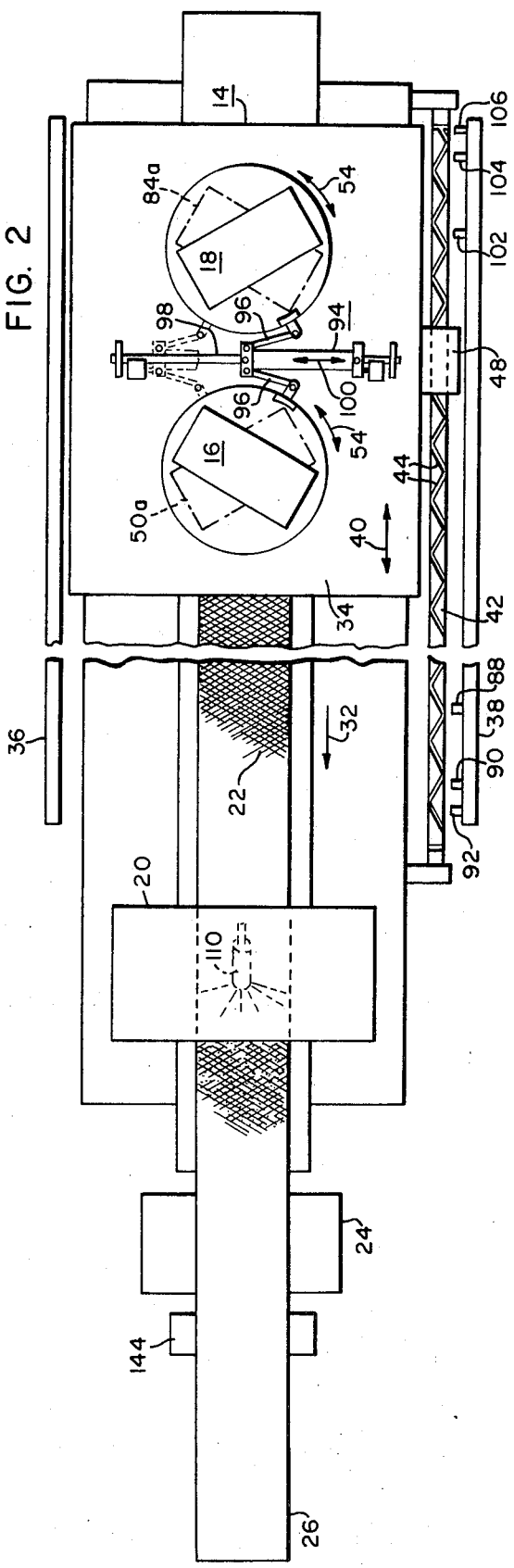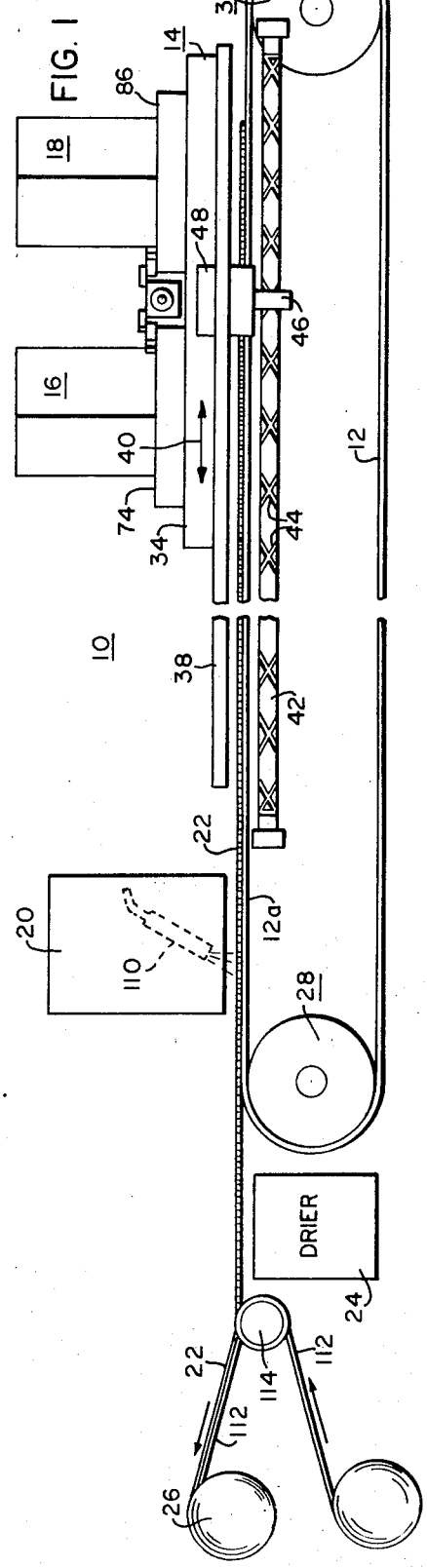

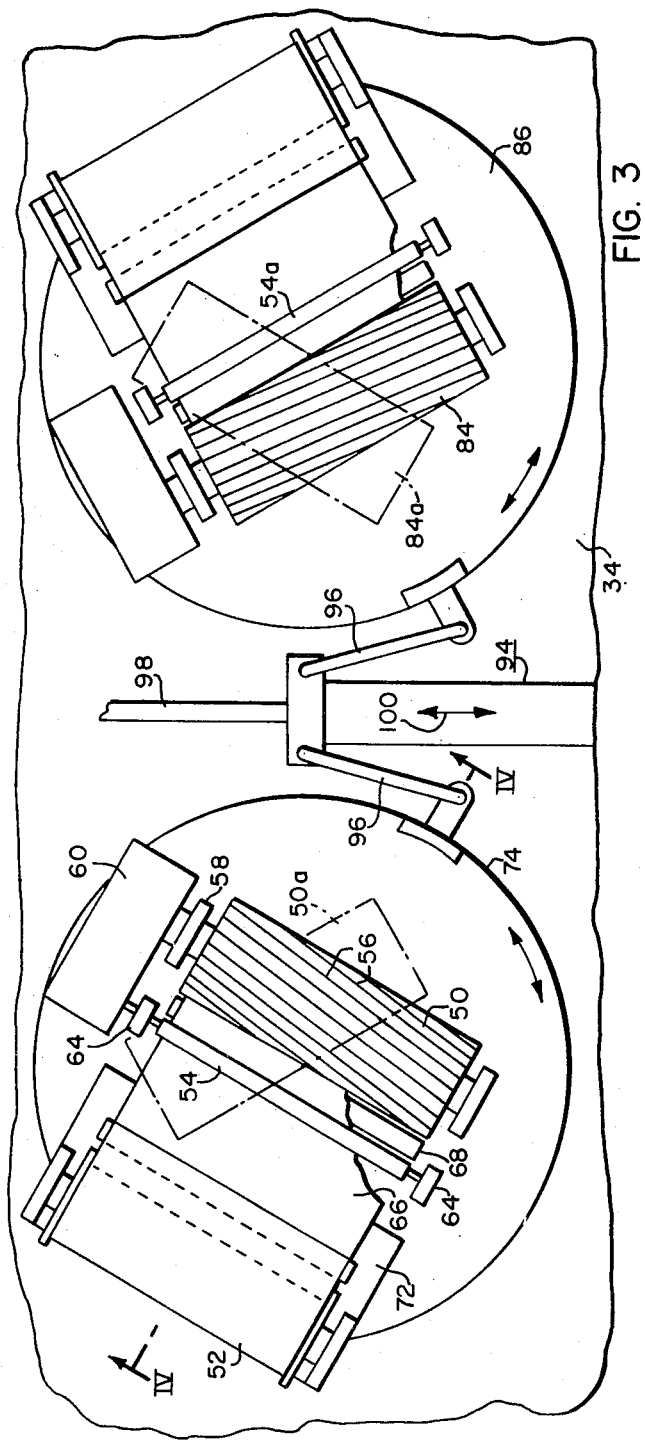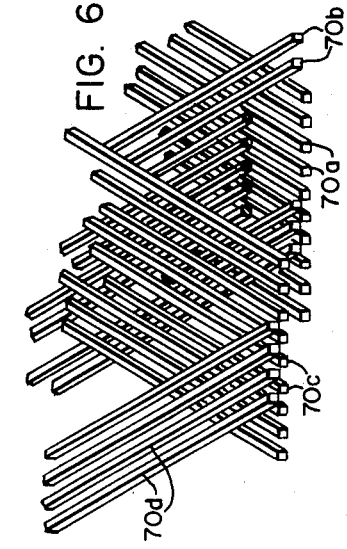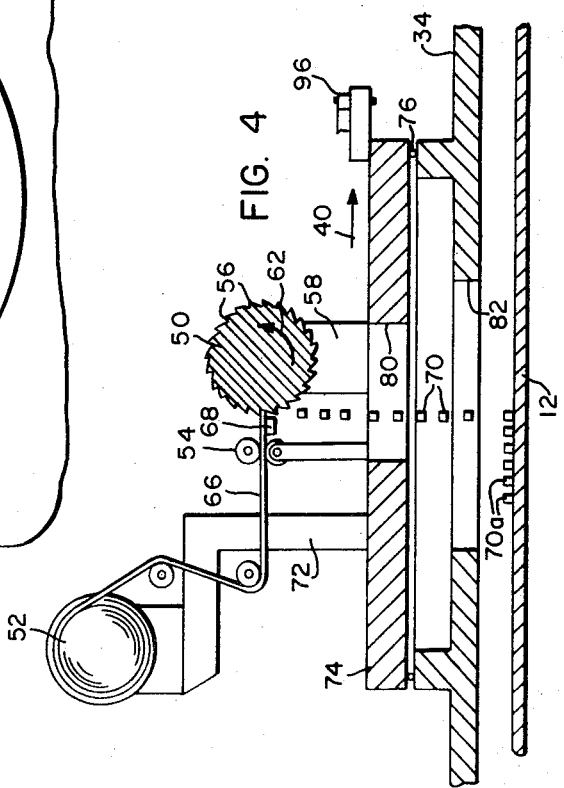

APPARATUS FOR MAKING A LAMINATED FIBROUS STRIP

BACKGROUND OF THE INVENTION

1. Field of the Invention

This invention relates to apparatus for producing continuous laminated fibrous structures and more particularly to a method of making the same.

2. Description of the Prior Art

Prior known procedures for making laminated fibrous structures have been dominated by manual operations. Heretofore metal foil has been shredded by foil shredding machines into fibers which were collected in a suitable container. The fibers were then manually placed on a flat surface and "combed" into some semblance of uniform orientation. This would provide a sub-lamination. Other laminations with fibers extending at angles to the sub-lamination were then stacked one upon the other to yield a complete laminate. That procedure has been followed to provide, for example, laminated fibrous plates for iron-nickel alkaline batteries.

The disadvantages of the manual procedure are well recognized and have created a demand for automatic apparatus and methods, whereby a laminate of two or more layers of metal fiber may be produced in a continuous ribbon or strip.

SUMMARY OF THE INVENTION

In accordance with this invention it has been found that the foregoing disadvantages may be overcome by providing a method and apparatus for laying out an elongated strip of two or more laminations or layers of metal fibers in which the fibers in each layer are disposed at angles to those of adjacent layers. The apparatus includes a conveyor belt, a carriage alternately movable in forward and reverse directions of the direction of travel of the belt, at least one shredder of metal foil, mounted on the carriage and being rotatable on an axis perpendicular to the plane of the belt, and the belt being movable at precycled discontinuous intervals with respect to the cycle of movement of the carriage, and the shredder being rotated at a different angle when the carriage moves in one direction as compared with the angle of the shredder when the carriage is moved in the opposite direction, so that a layer of fibers of shredded metal foil is laid in one direction on the belt as the carriage moves in one direction and another layer is laid at another angle on the first layer as the carriage moves in the opposite direction.

BRIEF DESCRIPTION OF THE DRAWINGS

FIG. 1 is an elevational schematic view of apparatus for making a continuous strip of laminated metal fibers;

FIG. 2 is a plan view of the apparatus of FIG. 1;

FIG. 3 is an enlarged fragmentary plan view of the shredders;

FIG. 4 is a vertical sectional view, taken on the line IV—IV of FIG. 3;

FIG. 6 is an enlarged fragmentary perspective view of the manner in which the metal fibers of the various layers are disposed.

DESCRIPTION OF THE PREFERRED EMBODIMENT

Figure 5:
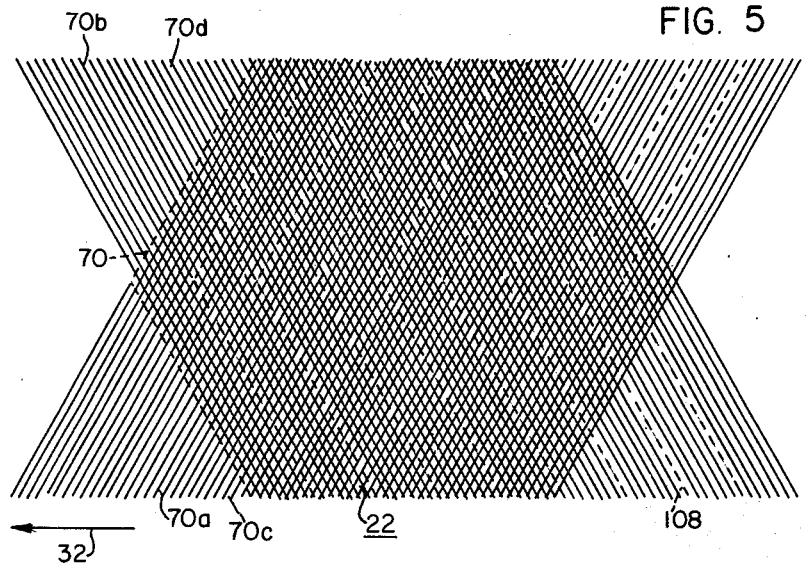
FIG. 5 is a plan view of the metal fibrous strip as it issues from the shredder shown in FIGS. 1 and 2.

The method of the present invention for preparing an elongated strip of laminated metal fibers comprises the steps of applying on an elongated supporting surface an initial layer of loose fine metal fibers disposed substantially parallel to each other, and then applying at least one other similar layer of fibers on the initial layer and at a substantial angle of at least 15° to the fibers of the initial layer, and the fibers of any additional layer being disposed at an angle to adjacent layers. The method provides for the application of at least two layers of fine metal fibers on a flat surface such as a conveyor belt which belt is moved discontinuously.

The device for performing the foregoing method is that shown in the drawings. In FIG. 1 a device generally indicated at 10 includes a conveyor belt 12, a carriage generally indicated at 14, a pair of metal foil shredders 16 and 18, a station 20 for applying an adhesive to a strip 22, an adhesive dryer station 24, and a coiler 26 for the strip.

The conveyor belt 12 is disposed around and between a pair of spaced belt support rolls 28 and 30 in a conventional manner, whereby one or both of the rolls drives the belt in the direction of the arrow 32. Thus, the upper portion 12a of the belt provides an elongated support surface upon which the strip 22 is laid. The belt 12 is preferably composed of a material having a surface of minimum of friction surface such as polyfluorotetraethylene and adapted to move in a discontinuous manner toward the station 20 at preset increments as is set forth below.

The carriage 14 is a rectangular support member such as a metal plate 34 that extends between a pair of parallel tracks 36 and 38 which are disposed on opposite sides of belt 12. The carriage 14 is adapted to move longitudinally of the belt 12 in the direction of the arrow 40. The carriage 14 is provided with means, such as reversing drive screw 42 for moving the carriage repetitively from one end of the tracks 36 and 38 to the other. The carriage 14 travels for a distance equal to the effective length of the groove 44, such as 12 feet. The speed of travel of the carriage 14 is less than 175 inches per minute.

The screw 42 has a spiral groove 44 that is engaged by a groove-following nut 46 that is mounted on the end of an arm 48 extending from one side of the carriage 14, whereby the carriage is moved back and forth on the tracks 36 and 38 as the drive screw rotates continuously.

The shredders 16 and 18 are commercially available products manufactured as Model No. D-100 by the Universal Tool and Manufacturing Company of Springfield, New Jersey. As shown more particularly in FIGS. 3 and 4 the shredder 16 includes a cutter head 50, a coil 52 of metal foil, and a pair of foil feed rolls 54. The cutter head 50 (FIG. 4) is a circular member having a plurality of spaced cutting edges 56 extending along the outer surface of the head and from one end to the other. The head 50 is mounted between a pair of journals 58 and is driven by a motor and gear box 60 in the direction of the arrow 62. The foil feed rolls 54, being mounted in journals 64 and driven by the motor and gear box 60, feed a strip 66 of metal foil from the metal foil coil 52 into the foil cutting area where the rotating cutting edges 56 cooperate with a shear bar 68. As a result the fibers 70 of metal are dropped upon the belt 12 (FIG. 4) at spaced intervals, such as the fibers 70*a*.

As shown in FIG. 4 the coil 52 is mounted on a support bracket 70. The bracket 72, and the journals 58 and 68 for the cutter head 50 and the foil feed rolls 54 are supported on a turn-table 74 which is rotatably mounted on bearing 76 on an annular collar 78 of the carriage plate 34. The turn-table 74 includes an opening 80 below the shear bar 68 and the carriage plate 34 has an opening 82 that is aligned with the opening 80 at whatever angle the turn-table may be positioned.

The shredder 18 is similar to the shredder 16 in construction and operation and in particular includes a cutting head 84 (FIG. 3) which is mounted on a turn-table 86 which, in turn is mounted on the carriage plate 34 in a manner similar to the turn-table 74. The shredder 18 differs from the shredder 16 in that it is disposed at a different cutting angle. Thus, as shown in FIG. 3, the axes of the cutting heads 50 and 84 are disposed at an angle, such as 90°, to each other. The cutting heads 50 and 84 are rotated at a speed of up to 600 rpm and preferably at 500 rpm.

The metal foil has a thickness range of from about 0.0008 inch to about 0.0012 inch, preferably about 0.001 inch. Each filament or fiber is cut to about 0.001 inch wide and may have a length that is within the confines of the size of the belt 12 and preferably about 8 inches. As the fibers are cut by the shredders 16 and 18, they drop through the openings 78 and 80. As shown in FIG. 2 the shredders 16 and 18 are disposed at angles to each other and the axes thereof represent the angle of disposition of the filaments or fibers as they are cut and drop onto the belt 12.

When the carriage 14 moves to the left, as shown by the arrow 40 in FIG. 2, both shredders 16 and 18 cut fibers of the metal foil which are deposited onto the belt with the fibers from the shredder 16 forming the lowermost layer and the fibers from the shredder 18 being disposed thereon. Accordingly, the lower layer of fibers 70*a*, as shown in FIG. 6, are disposed at one angle and the fibers 70*b* on the next adjacent layer are disposed at a different angle and preferably about 1 mil apart. As the carriage 14 approaches the end of the tracks 36 and 38, it actuates a limit switch 88 that shuts off the load shredder 16 by disengaging a clutch (not shown) in the motor and gear box 60 to stop the feed rolls 54 from turning. However, the rear shredder 18 continues to operate, dropping fibers 70*b* on the first layer of fibers 70*a*, until a limit switch 90 is actuated. Thereafter, the carriage 14 continues moving until the nut 46 reaches the left end of the groove 44, whereupon a limit switch 92 is actuated to cause the shredders 16 and 18 to rotate to alternate positions such as shown by the dotted lines 50*a* and 84*a* as shown in FIGS. 2 and 3. The distance between the centers of the cutting heads 50 and 84 is not material. Rather the distance between the limit switches 88 and 90 controls the "on" and "off" operations of the heads.

Any suitable means may be provided for rotating the turn-tables 74 and 86 simultaneously, such as a pneumatic cylinder 94 having connecting links 96 extending from the outer end of a piston rod 98. Thus, movement of the rod 98 in the direction of the arrow 100 causes the shredders 16 and 18 to move between the solid line positions and the dotted line positions 50*a* and 84*a*. The angles of disposition of the shredders may vary by presetting the distance of travel of the cylinder rod 98. As a result, each shredder 16 and 18 may be rotated from a small to a large angle, depending upon the desired density of the strip 22. Thus, each shredder 16 and 18 may be turned to any other angle. Moreover, the angles between the shredders 16 and 18 may be set for varying amounts, depending upon the desired angle of the fibers 70*a* and 70*b* (FIG. 6), such as for example a minimum of about 15° up to about 90°.

As the reversing drive screw 42 continues to turn, the carriage 14 moves to the right. The limit switch 90 is released to start the strip feed rolls 54*a* (FIG. 3) of the shredder 18 to feed strip 22 into the cutting head 84 whereupon the shredder 18 becomes the lead shredder and the shredder 16 becomes the logging shredder. The shredder 16 starts to operate as the limit switch 88 is released. As a result, two additional layers of fibers are laid upon the previous layers of fibers 70*a* and 70*b*. The additional layers include a third layer of fibers 70*c* and a fourth layer of fibers 70*d* (FIG. 6). The third layer of fibers 70*c* is laid by the shredder 18 and the fourth layer is laid by the shredder 16. Like the first and second layers, the length of the third and fourth layers is dependent upon the distance of travel of the carriage 14. The length of the tracks 36 and 38 may be 12 feet long but the length of the layers is limited to the distance between the limit switches 88 and 102.

As the carriage approaches the right end of the tracks 36 and 38, it actuates three limit switchs 102, 104 and 106, which correspond to the switches 88, 90 and 92, respectively, that is, the lead shredder 18 stops cutting fibers with actuation of switch 102 and the logging shredder 16 continues cutting until the switch 104 is actuated. The carriage 14 continues moving to the right until the reversing drive screw 42 starts the nut 46 in the return (left) direction. Thereafter the shredders 16 and 18 resume cutting fibers in a manner similar to that set forth above and with the shredder rotated again.

Each time the carriage 14 reaches the end of its travel, either to the right or left, it actuates the limit switches 92 or 106 to rotate the shredders 16 and 18 between their alternate positions as set forth above. In addition the limit switches 92 and 106 also cause the belt 12 to advance in the direction of the arrow 32 through a preset increment of travel, such as 6 inches. In that manner the carriage with the shredders 16 and 18 continue indefinitely to lay a continuous strip 22 of layers of fibers. Each time the belt 12 advances a predetermined distance, the length of the strip is extended by an increment equal to the distance of advance of the belt.

As shown in FIG. 5, the initial layer 70*a* of fibers as provided during the first leftward movement of the shredder 16 is initially laid on the belt 12 with the second layer 70*b* of fibers, provided by the shredder 18, being disposed thereon and at an angle thereto. When the shredders 16 and 18 are reversed to their other cutting angles, the third and fourth layer of fibers 70*c* and 70d are laid upon the first two layers. With the belt 12 advancing a predetermined distance each time the carriage 14 reverses its direction of travel, the end portions of each pair of layers of fibers are covered by succeeding layers as a result of the discontinuous, segmental travel of the belt 12 in the direction of the arrow 32. These segments of travel are represented by the several chevron-like broken lines 108. Accordingly, the forward end portions of each pair of layers of fibers are uncovered for a dimension equal to the distance of travel of the belt 12. However, the rear end portions of each pair of layers of fibers extend beyond the previous layers of fibers by a distance equal to the distance of travel of the belt each time the carriage changes direction.

By turning the shredders 16 and 18 to different indexing angles the belt 12 is indexed to advance a preset distance at a preset speed. It is understood that all of the foregoing changes; namely, the positions of the turn-tables and shredders as well as the distance of advance of the belt are adjustable and dependent upon the desired number of layers of fibers in the laminated strip 22. It is also dependent upon the desired density of the final product strip.

Manifestly, the apparent density of the resulting strip may be altered by varying the speed of rotation of the shredders 16 and 18, or by varying the speed of travel of the carriage to the right and left. As was indicated above, the carriage 14 is pushed by a reversing drive screw 42 which is powered by a variable speed DC shunt wound motor.

As the strip 22 moves to the left on the belt 12, it enters the adhesive station 20, wherein spray means such as a nozzle 110 are provided for applying a coating of an adhesive such as methyl methacrylate. Thereafter the strip 22 passes off of the end of the belt 12 and over a dryer 24 which removes any remaining liquid residue in the adhesive. Inasmuch as the adhesive completely penetrates the several layers or laminations of fibers of the strip 22 and is partially dry before it reaches the dryer station 24 the strip with the adhesive has sufficient strength to move off of the belt 12 over the dryer station, and to be wound on a coiler 26 with a separation strip 112 of suitable material such as wax paper disposed between the overlapping portions of the strip in the coiler. For that purpose the separation strip 112 passes over a roller 114 and moves into the coiler 26 with the strip 22.

It is understood that although two shredders 16 and 18 are mounted upon the carriage 14, any other number of shredders such as one or more may be provided. Moreover, where a suitable number of shredders are provided the conveyor belt 12 may be moved continuously instead of discontinuously as described above. Indeed, where the number of shredders is equal to the number of layers or laminations for a given strip the carriage 14 may be maintained in a stationary position with the shredders operating to provide the desired final strip.

Figure 7:
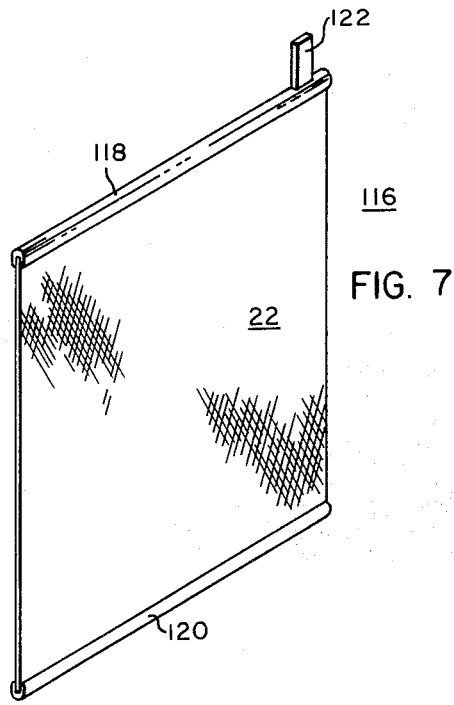
FIG. 7 is a perspective view of a battery plate as an example of one product for which the laminated metal strip may be used.

Although the laminated strip 22 may be used for various purposes, a primary use for the strip is that of a plaque or plate for storage batteries. For that purpose the strip 22 is removed from the coiler and cut into suitable lengths to serve as plaques or plates 116 as shown in FIG. 7. The upper and lower edges of each plate are reinforced by metal clips 118 and 120 and an electric contact lug 122 is provided on the clip 118. Where the plate 116 is to be used as a positive plate in a battery, the fibers composing the strip 22 of which the plate is composed may be composed of nickel. Where the plates 116 are to serve as the negative plates in a battery, the strip 22 is coated and filled with a mixture of iron oxide and sulfur including $Fe_2O_3$, $Fe_3O_4$, and sulfur.

It is understood that the method and device of this invention are limited to a system for applying a number of layers of fibers that is greater than the number of shredders, whereby the belt necessarily moves discontinuously and the shredders are mounted on a reciprocating carriage. Where the number of shredders is equal to at least the number of layers, there is no necessity for mounting the shredders on a reciprocating carriage and the belt moves continuously whereby all layers are applied simultaneously, one upon the other, as the belt advances.

Accordingly, the apparatus and method of the present invention provide for the manufacture of a continuous strip of a laminated structure of metal fibers, which satisfy the disadvantages of prior manual procedures as well as providing a more uniform structure at a reduced cost.

What is claimed is:

1. An apparatus for preparing a laminated strip of layers of metal fibers with the fibers of each layer disposed at an angle to that of an adjacent layer, comprising a conveyor belt, a carriage alternately movable in forward and reverse directions of the direction of travel of the belt, at least one shredder of metal foil being mounted on the carriage, the shredder being rotatable on an axis perpendicular to the plane of the belt, means for rotating the shredder between two positions at angles to each other and operable at the end of travel of the carriage in each direction, means for moving the belt at segmental distances synchronized with the end of travel of the carriage in each direction, whereby one layer of fibers is layed at one angle on the belt as the carriage moves in one direction and another layer is layed at another angle on the one layer as the carriage moves in the opposite direction.

2. The apparatus of claim 1 wherein at least two shredders are mounted on the carriage, each shredder being rotatable from one position to a second position at the end of travel of the carriage in each direction, and means for rotating the shredders simultaneously.

3. The apparatus of claim 2 wherein each shredder is disposed at an angle to the adjacent shredder and is rotatable between two positions alternately with respect to the adjacent shredder.

4. The apparatus of claim 1 wherein the means for rotating the shredder are synchronized with the ends of travel of the carriage.

* * * * *